July 25, 1950 T. L. RICHTER ET AL 2,516,592

DEVICE FOR DISPLAYING EMERGENCY LISTINGS ON TELEPHONES

Filed Dec. 30, 1947

Inventor
THEODORE L. RICHTER
RALPH F. LESCOVICH
By Jack R Snyder
Attorney

Patented July 25, 1950 2,516,592

UNITED STATES PATENT OFFICE 2,516,592

DEVICE FOR DISPLAYING EMERGENCY LISTINGS ON TELEPHONES

Theodore L. Richter and Ralph F. Lescovich, Dormont, Pa.

Application December 30, 1947, Serial No. 794,472

2 Claims. (Cl. 40—10.5)

This invention relates to a device for displaying emergency listings on a telephone, and important objects and advantages thereof are to provide a device of the character described, which may be readily and conveniently connected to or detached from the conventional dial type of telephone instrument, which prominently displays a plurality of emergency telephone numbers whereby the latter are constantly and instantly available when required, and in consequence minimize hazards to life and property owing to undue delay in quickly obtaining assistance, which is simple in its construction and arrangement, durable and efficient in its use, compact, attractive in appearance, and comparatively economical in its manufacture.

With the foregoing and other objects in view, which will appear as the description proceeds, the invention resides in the novel construction, combination and arrangement of parts herein specifically described and illustrated in the accompanying drawing, but it is to be understood that changes in the form, proportions and details of construction may be resorted to that come within the scope of the claims hereunto appended.

In the drawing wherein like numerals of reference designate corresponding parts throughout the several views.

Figure 1:
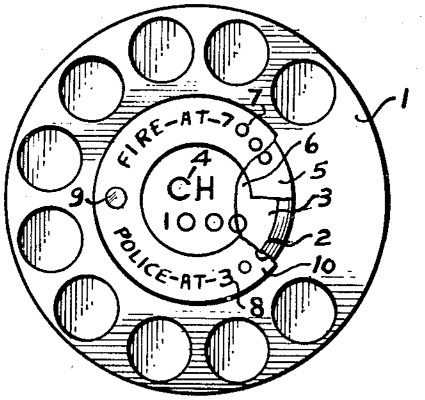
Figure 1 is a top plan view of the operating disk of a dial type of telephone embodying the present invention.
Figure 2:
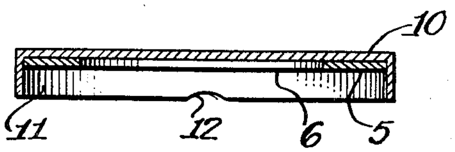
Figure 2 is a cross sectional view of the display member and of the clamping cap for the latter.

Referring in detail to the drawing 1 represents the circular operating disk of an automatic dial type of telephone instrument of the conventional construction. The operating disk is formed with the centrally disposed, raised, concentrically arranged annular ridge 2, which surrounds and frames the conventional card 3 bearing the call number 4, of the telephone instrument carrying the latter, in the usual well-known manner.

The invention comprises a flat, annular display member 5 provided with a large, centrally disposed, circular opening 6. The display member is preferably constructed of fairly stiff paper, but obviously may be constructed of any other suitable material.

Printed in prominent type, preferably red in color, on the outer face of the upper portion of the display member 5, is the word "Fire" together with the associated indicia 7 designating the telephone call number of the local fire department. In like manner, the word "Police," together with the associated indicia 8 designating the telephone call number of the local police department, is printed on the outer face of the lower portion of the display member. The fire and police designations are arranged in circular alignment, and are separated from each other by a pair of fairly large, interposed, printed dots 9 to eliminate the possibility of confusion when quickly viewing and selecting the required telephone call number in the case of an emergency.

The diameter of the display member 5 is identical to the outer peripheral diameter of the annular ridge 2, and when the device is assembled on the operating disk 1, the display member is seated directly on the top of the annular ridge, as clearly shown in Figure 1.

The display member 5 is securely held in position on the annular ridge 2 by means of a clamping cap 10, which latter overlaps and encloses the display member. The clamping cap includes a side wall 11 which frictionally engages the outer side wall of the annular ridge 2.

The clamping cap 10 is constructed of clear transparent material, preferably plastic material, and is sufficiently elastic to allow the side wall 11 thereof to frictionally engage the annular ridge 2 and thereby maintain the secured attachment of the clamping cap with the annular ridge. The lower free edge of the clamping cap wall 11 is provided with a notch 12 for the insertion of a suitable implement to facilitate the detachment of the clamping cap from the annular ridge when required.

When the display member 5 and the clamping cap 10 are assembled on the annular ridge 2 of the operating disk 1, in the manner stated, the display member will be held flatly and closely against the inner face of the clamping cap, and, as the latter is transparent, the fire and police designations printed on the display member will be plainly and legibly shown. It is, of course, apparent that, due to the opening 6 in the display member, the call number 4 of the telephone instrument will be clearly discernible through said opening 6.

Figure 3:
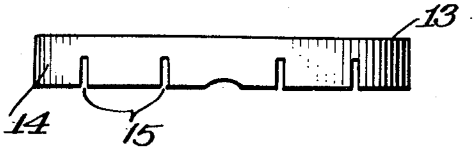
Figure 3 is a side elevational view of a modified form of clamping cap.

The modified form of clamping cap 13, shown in Figure 3, differs from the clamping cap 10 above described, only in that the side wall 14 of the former is provided with a plurality of spaced, vertically extending slits 15 to facilitate the frictional engagement of said clamping cap 13 on the annular ridge 2 of the operating disk 1.

The present invention provides a most efficient device of its kind, which may be economically constructed, and successfully employed for the purposes and in the manner herein set forth.

What we claim is:

1. A device for displaying emergency listings on a dial-type telephone including an operating disk provided with a centrally disposed raised annular ridge surrounding the telephone listing, comprising the combination of a circular member bearing the emergency listings mounted on the top of said ridge, said member being formed with a centrally disposed opening of sufficient size to allow the display of the telephone listing, and a transparent cap mounted on said ridge and covering said member, said cap including a depending flange frictionally engaging the periphery of said ridge for holding said cap and said member in position on said ridge.

2. A device for displaying emergency listings on a dial-type telephone including an operating disk provided with a centrally disposed raised annular ridge surrounding the telephone listing, comprising the combination of a circular member bearing the emergency listings mounted on the top of said ridge, said member being formed with a centrally disposed opening of sufficient size to allow the display of the telephone listing, and a transparent cap mounted on said ridge and covering said member, said cap including a depending annular flange frictionally engaging the periphery of said ridge for holding said cap and said member in position on said ridge, said flange being slitted to facilitate the engagement of said flange on said ridge.

THEODORE L. RICHTER.
RALPH F. LESCOVICH.

REFERENCES CITED

The following references are of record in the file of this patent:

UNITED STATES PATENTS

| Number | Name | Date |
|---|---|---|
| 578,589 | Vernon | Mar. 9, 1897 |
| 592,968 | Gipe | Nov. 2, 1897 |
| 621,589 | Vernon | Mar. 21, 1899 |
| 683,888 | Bright | Oct. 1, 1901 |
| 1,378,774 | Farmer | May 17, 1921 |
| 1,546,557 | Smith | July 21, 1925 |
| 1,765,445 | Porter | June 24, 1930 |
| 1,949,447 | Beck | Mar. 6, 1934 |
| 2,088,688 | Casey et al. | Aug. 3, 1937 |
| 2,175,840 | Isasi | Oct. 10, 1939 |
| 2,214,030 | Pereles | Sept. 10, 1940 |
| 2,268,248 | Goff | Dec. 30, 1941 |